United States Patent
Moon et al.

(10) Patent No.: US 6,809,297 B2
(45) Date of Patent: Oct. 26, 2004

(54) COMBINATION ROTISSERIE AND CONVECTION OVEN HAVING MOVABLE HEATING ELEMENT

(75) Inventors: Jung S. Moon, Buffalo Grove, IL (US); Rong Liu, Gurnee, IL (US); Kitak Chae, Seoul (KR); Jongrok Kim, Seoul (KR)

(73) Assignee: Hearthware Home Products, Inc., Gurnee, IL (US)

( * ) Notice: Subject to any disclaimer, the term of this patent is extended or adjusted under 35 U.S.C. 154(b) by 0 days.

(21) Appl. No.: 10/156,728

(22) Filed: May 28, 2002

(65) Prior Publication Data

US 2003/0222073 A1 Dec. 4, 2003

(51) Int. Cl.[7] ............................. A47J 37/04; A21B 1/26
(52) U.S. Cl. ....................... 219/400; 219/404; 99/421 H
(58) Field of Search ................. 219/400, 404; 99/421 H–421 HV, 331–333

(56) References Cited

U.S. PATENT DOCUMENTS

| | | | |
|---|---|---|---|
| 2,478,253 A | * 8/1949 | Doner | 219/404 |
| 2,848,592 A | * 8/1958 | Mergen | 219/404 |
| 2,893,307 A | 7/1959 | Rodriguez | 99/421 |
| 2,898,437 A | 8/1959 | McFarland | |
| 4,300,523 A | * 11/1981 | Robertson et al. | 126/21 A |
| 4,663,517 A | 5/1987 | Huff et al. | 219/404 |
| 5,308,956 A | * 5/1994 | Halters et al. | 219/400 |
| 5,339,726 A | * 8/1994 | Poulson | 219/400 |
| 5,485,780 A | 1/1996 | Koether et al. | 99/419 |
| 5,676,870 A | * 10/1997 | Wassman et al. | 219/400 |
| 5,735,190 A | 4/1998 | Sham | 99/327 |
| 5,801,357 A | 9/1998 | Danen | 219/403 |
| 5,801,362 A | 9/1998 | Pearlman et al. | 219/400 |
| 5,960,781 A | 10/1999 | Walter et al. | |
| 6,123,014 A | * 9/2000 | Jo | 99/421 H |
| 6,363,836 B1 | 4/2002 | Usherovich | 99/339 |
| 6,405,640 B1 | * 6/2002 | Moreth | 99/334 |
| 6,418,835 B1 | * 7/2002 | Lin | 99/421 H |

FOREIGN PATENT DOCUMENTS

DE    21 08 147    8/1972

* cited by examiner

*Primary Examiner*—Joseph Pelham
(74) *Attorney, Agent, or Firm*—Greer, Burns & Crain, Ltd.

(57) ABSTRACT

A combined rotisserie and convection oven includes a cooking chamber having a first end and a second end. A fan is in fluid communication with the cooking chamber for creating an airflow in the cooking chamber, and a removable spit is rotatably suspended between the first and second ends of the cooking chamber. A heating element for providing the cooking temperature is provided in the cooking chamber, and is movable to a plurality of positions within the cooking chamber.

23 Claims, 4 Drawing Sheets

COMBINATION ROTISSERIE AND CONVECTION OVEN HAVING MOVABLE HEATING ELEMENT

The present invention generally relates to ovens, and more particularly to an oven that functions both as a rotisserie oven and a convection oven.

BACKGROUND

Ovens that have both rotisserie and convection cooking features are known. These ovens typically include a rotating spit and a heating element for rotisserie cooking, and a fan for circulating hot air within the oven to facilitate convection cooking, in conjunction with or independently of rotisserie cooking. The ovens may have a dedicated heating element for rotisserie cooking and a separate heating element for convection cooking, or they may employ the same heating element for both rotisserie and convection cooking. Typically, though, the known ovens generally have a rectangular shaped cooking chamber and a fan located either on the top or the back of the cooking chamber. These arrangements generally do not allow airflow to closely travel around or surround the food item, and also creates "dead zones," particularly in the corners where airflow is restricted, resulting in temperature and airflow variations in the cooking chamber. Thus, desired uniform cooking is difficult to attain in these ovens.

Another feature that is common to known ovens is a stationary heating element. Typically, the heating element(s) is located in the cooking chamber at a location generally above the food. While this arrangement may be useful in the type of cooking where direct radiant heat source is required, as in broiling or roasting, for example, it is not ideal for baking, in which direct radiant heat is generally not desirable.

SUMMARY OF THE INVENTION

The present invention is directed to a combined rotisserie and convection oven which includes a cooking chamber having a first end and a second end. A fan is in fluid communication with the cooking chamber for creating an airflow in the cooking chamber, and a removable spit is rotatably suspended between the first and second ends of the cooking chamber. A heating element for providing the cooking temperature is provided in the cooking chamber, and is movable to a plurality of positions within the cooking chamber.

DETAILED DESCRIPTION OF THE INVENTION

Figure 1:
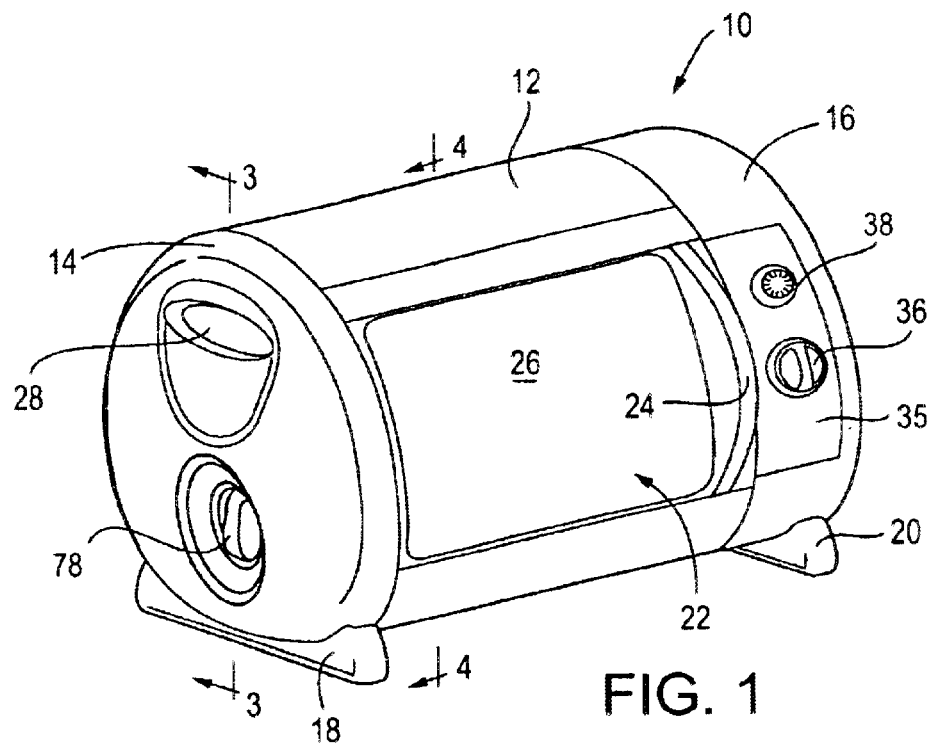
FIG. 1 is a perspective view of an oven in accordance with one embodiment of the invention.
Figure 2:
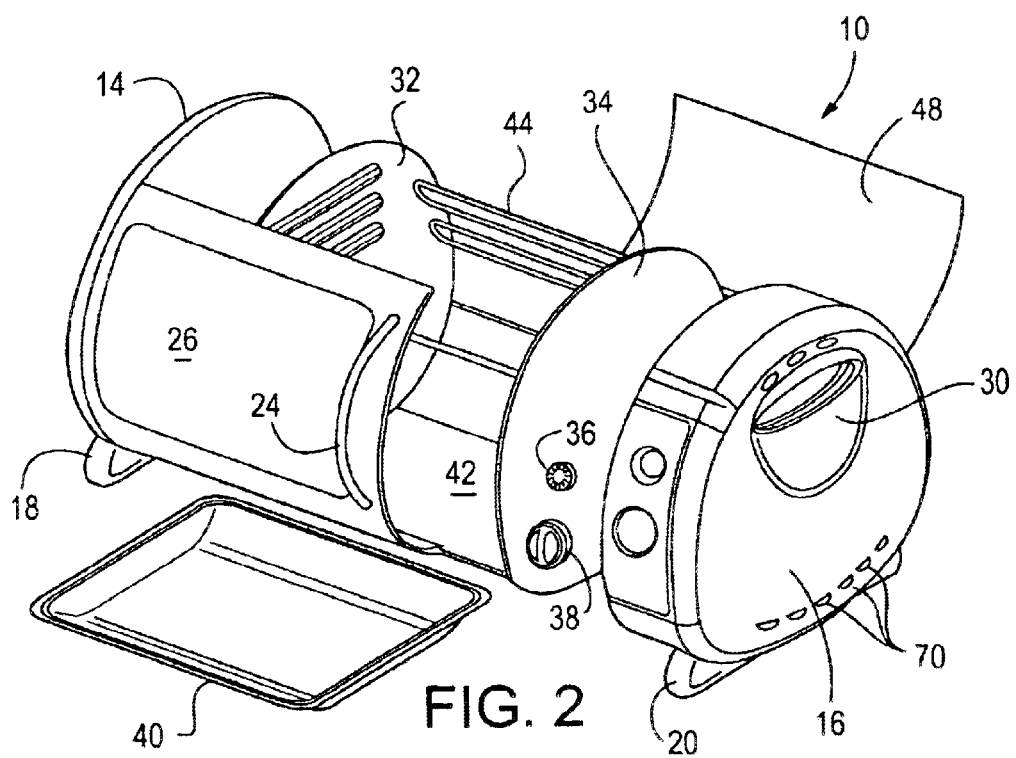
FIG. 2 is an exploded perspective view of the oven of FIG. 1.

Turning now to FIGS. 1–2, the oven in accordance with one embodiment of the invention is designated generally at 10, and includes, a cooking chamber 12 provided between a pair of end housings 14, 16. A leg 18 attached to the bottom of the end housings 14 and a leg 20 attached to the bottom of the end housing 16 support the oven 10 off the surface on which the oven is placed. A door 22 is hinged to the end housing 14 and allows access to the cooking chamber 12 when opened by a handle 24 on the opposite side of the door proximate the end housing 16. The door 22 includes preferably a clear heat-resistant glass panel 26 to enable the user to view into the cooking chamber 12.

Handles 28, 30 are formed in the end housings 14, 16, respectively, to allow the user to grasp and lift the oven 10. The handles 28, 30 are spaced respectively from side walls 32, 34 of the cooking chamber 12 (best shown in FIG. 2), to insulate the handles from the cooking chamber. On the end housing 16 (shown on the right in FIG. 1), a control panel 35 is provided and includes a timer switch 36 for setting the desired cooking time, and a temperature switch 38 for setting the desired temperature in the cooking chamber 12. A removable liner pan 40 rest on a bottom 42 of the cooking chamber 12 (best shown in FIGS. 2 and 3) for catching any liquid or particles that may come off the food (not shown) being cooked.

Figures 3, 7, 10:
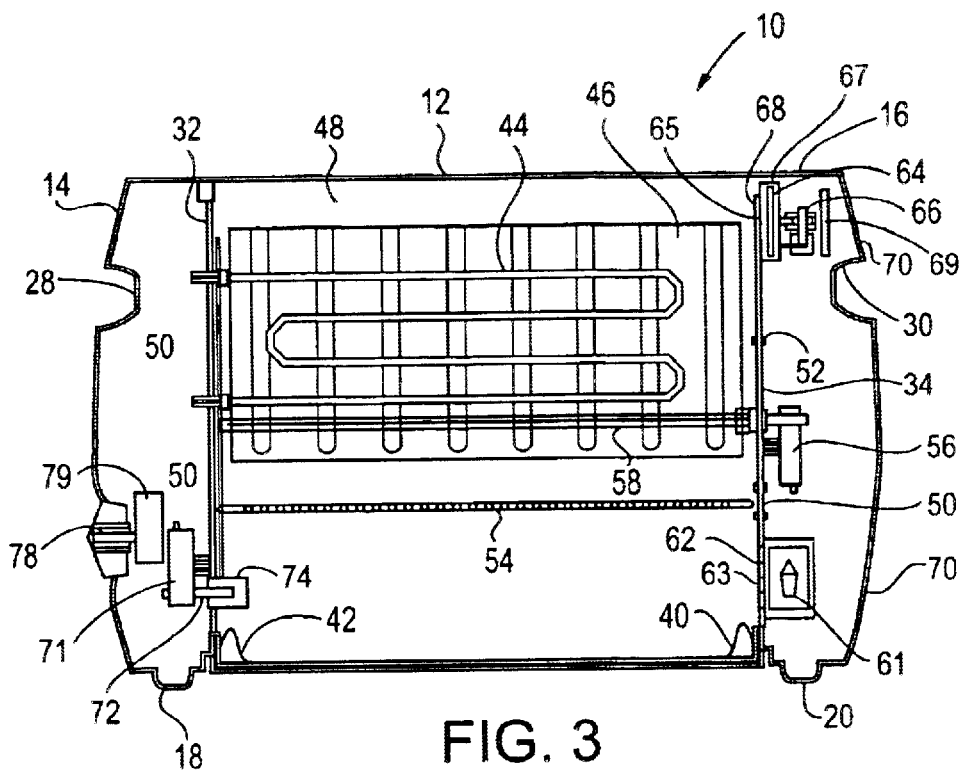
FIG. 3 is a sectional view of the oven of FIG. 1, generally along line 3—3.
FIG. 7 is a side view of the oven of FIG. 1.
FIG. 10 is a diagram illustrating a cyclonical airflow created in the cooking chamber of the oven of FIG. 1.

Turning now to FIG. 3, the heat source for the oven 10 is provided by a heating element 44, which is preferably a ceramic coated infrared heater. The heating element 44 generally resembles a letter "m" on its side and extends substantially the width of the cooking chamber 12. A reflection board 46 may be provided between the heating element 44 and a cylindrical wall 48 of the cooking chamber 12 to reflect heat towards the center of the cooking chamber.

Figure 4:
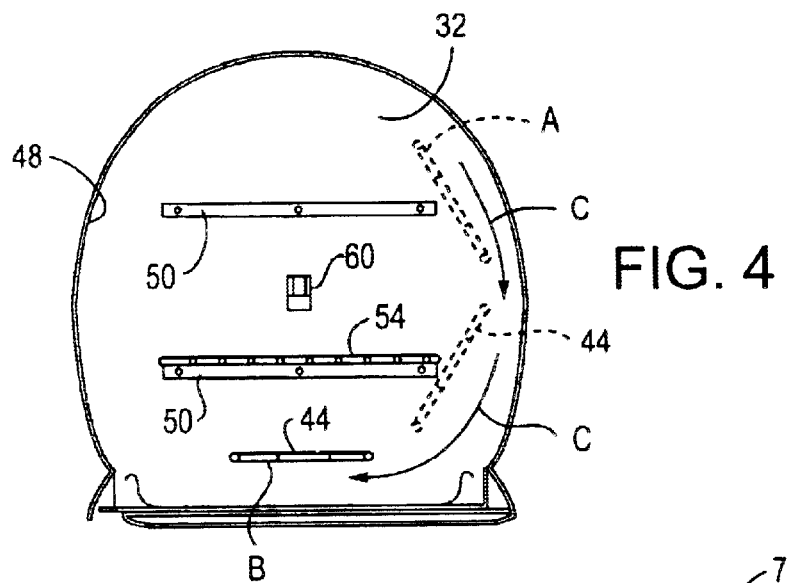
FIG. 4 is a partial sectional view of the oven of FIG. 1, generally along line 4—4.

A plurality of elongated metal brackets 50 (two shown) are provided on the side wall 32 at various heights, and corresponding brackets 52 are provided at the same height on the opposite side wall 34. The brackets 50, 52 extend generally horizontally along the side walls 32, 34, but not completely to the cylindrical wall 48 (best shown in FIG. 4). The corresponding pairs of brackets 50, 52 are configured to have a generally planar cooking rack 54 placed thereon for holding food. The rack 54 may be a pan or a grill, and may be placed on any one of the pairs of brackets 50, 52 as desired by the user.

In accordance with an embodiment of the present invention, the end housing 16 includes a spit rotating motor 56 which is attached generally centrally to the side wall 34. The spit 58 extends between the side walls 32, 34, and rests rotatably and removably at one end on a support 60 (best shown in FIG. 4), which is located generally at the center of the side wall 32, and rotatably engages the motor 56 through the side wall 34 at the other end. The motor 56 is a gear reduced type including a gear transmission box (not separately shown) to reduce the rpm to the rotating spit 58. The final speed of roation will be around 2–3 rpm. A light source 61 is also provided in the end housing 16 and illuminates the cooking chamber 12 through an opening 62 in the side wall 34. A glass cover 63 is installed in the opening 62, and separates the light source 61 from the cooking chamber 12.

The light source is an incandescent light bulb and is connected to an on-off switch (not shown).

A blower fan 64 is also provided in the end housing 16, and is exposed to the cooking chamber 12 through an opening or recess 65. The blower fan 64 is made of aluminum or other heat resistant material to provide convection hot airflow inside the cooking chamber 12. The fan 64 is attached to a C-frame motor 66, which is activated to rotate the fan 64. A fan case 67 separates the blower fan 64 from the other areas of the end housing 16, to prevent hot air from getting into the end housing. In front of the fan 64, there are multiple openings or a protection grill 68 to prevent food particles from entering the fan case 67. A cooling fan 69 is operatively connected to the drive shaft of the motor 66 on the opposite end from the blower fan 64 for cooling the inside of the end housing 16. When energized, air (shown as curved arrows) is pulled in from the outside of the oven 10, through a plurality of air inlets 70 formed on the end housing 16 (best shown in FIG. 2), and circulated within the end housing to cool the end housing.

In the other end housing 14, a heating element rotating motor 71 is attached to the side wall 32 proximate the leg 18. The motor 71 rotatably drives a shaft 72 connected to a drive gear 74, which extends into the cooking chamber 12 through the side wall 32. The drive gear 74 is adapted and configured to engage a generally "D" shaped wheel 76 (best shown in FIG. 5) for positioning the heating element 44 at various locations within the cooking chamber 12. A selector switch 78 (also shown in FIG. 7) controlled by the user sets the positions of the heating element 44 via the motor 71. Preferably, the motor 71 is a gear reduced type including a gear transmission box (not separately shown) to reduce the rpm to the drive gear 74. The selector switch 78 is operatively connected to a control box 79, which controls the motor 71 for moving the heating element 44 to the desired position corresponding to the selector switch positions. The selector switch 78 also controls the spit rotating motor 56 via the control box 79, so that the spit 54 is rotated to coincide with a predetermined position of the heating element 44. For example, the spit rotating motor 56 is energized to rotate the spit 58 when the selector switch 78 is rotated to a position to move the heating element 44 to facilitate rotisserie cooking. The motor 56 is not energized when the switch 78 is rotated to move the heating element 44 to facilitate the type of cooking which does not require direct radiant heat such as baking.

Figure 5:
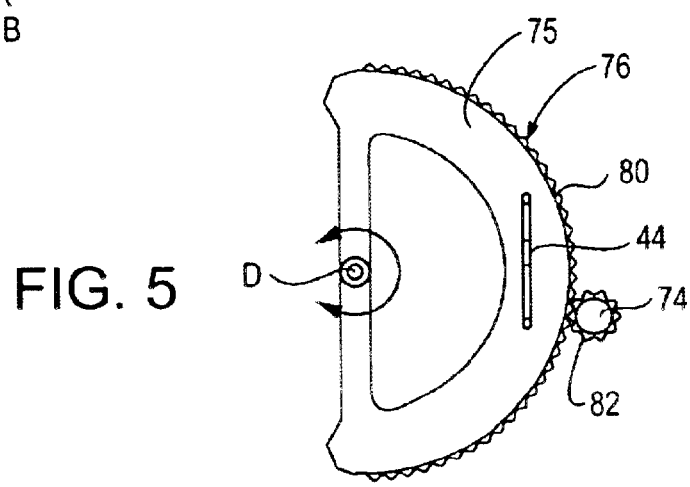
FIG. 5 shows a device for rotating a heating element in accordance with one embodiment of the present invention.
Figure 6:
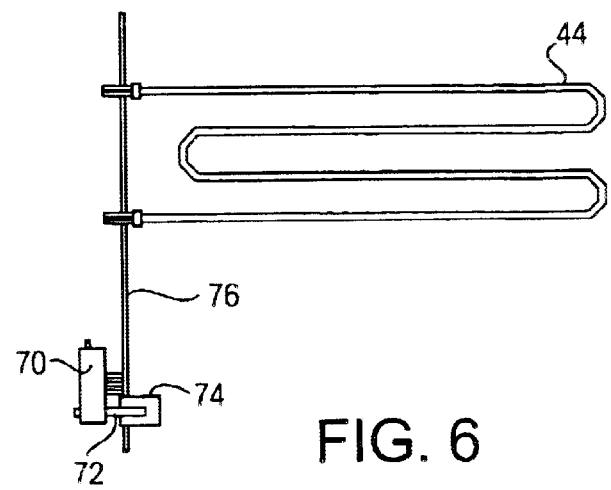
FIG. 6 shows the rotating device of FIG. 5 connected to a motor for driving the rotating device in accordance with one embodiment of the invention.

Turning now to FIGS. 4–7, the heating element 44 is adapted to be located at a top position A (shown in phantom) and rotated around to a position B underneath the rack 54 along the path indicated by arrows C. In this manner, the heating element 44 can be positioned at the locations best suited for the type of cooking desired by the user. The rotation of the heating element 44 is made possible through the D-shaped wheel 76 (best shown in FIG. 5). As shown in FIGS. 5 and 6, the heating element 44 is attached to and extends perpendicularly out of the flat surface 75 of the wheel 76 at approximately the midpoint in the curved portion of the wheel. The wheel 76 is rotatably attached to the side wall 32 at point D on the straight portion of the wheel and at approximately the center of the side wall. The wheel 76 includes teeth 80 which are configured to engage teeth 82 that are formed on the drive gear 74 connected to the heating element rotating motor 70. As the drive gear 74 is driven by the motor 71, the wheel 76 rotates about point D.

Figure 8:
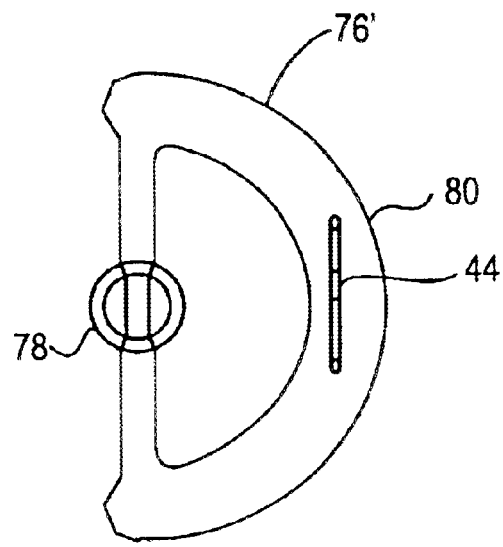
FIG. 8 shows another embodiment of a device for rotating the heating element in accordance with another embodiment of the present invention.

Turning now to FIG. 8, and in accordance with another embodiment of the invention, a D-shaped wheel 76' for rotating the heating element 44 is connected directly to the selector switch 78. In this arrangement, the wheel 76 is rotated manually by the user by turning the switch 78. As such, the motor 71 and the gear 74 are unnecessary, and accordingly, the teeth 80 formed on the wheel 76 (best shown in FIG. 5) are also not required. The selector switch 78 is electrically connected to the spit rotating motor 56 to energize the motor when the heating element 44 is rotated to a position that facilitates rotisserie cooking (Position A in FIG. 4).

In operation, food (not shown) is placed on the cooking rack 54, and the heating element 44 is located at position B (best shown in FIG. 4) for cooking food on the top of the rack 54. In this manner, the oven 10 functions as a convection oven. To operate the oven 10 as a rotisserie oven, food is skewered through the spit 58 (best shown in FIG. 3) and the heating element 44 is located at position A (best shown in FIG. 4), so that direct radiant heat is applied to the food.

Regardless of the type of cooking, the desired cooking temperature is set using the temperature switch 38, and the cooking time is set by the timer switch 36 (best shown in FIG. 1). The timer switch 36 activates the motor 66 for driving the fan 64 for creating the convection airflow in the cooking chamber 12, and the fan 69 for generating cooling air in the end housing 16. The timer switch 36 also energizes the heating element 44 to bring the temperature inside the cooking chamber 12 to the level set by the temperature switch 38. The spit rotating motor 56 is activated coincident with the position of the selector switch 78 that facilitates rotisserie cooking, i.e., when the heating element 44 is set to position A (best shown in FIG. 4).

Figure 9:
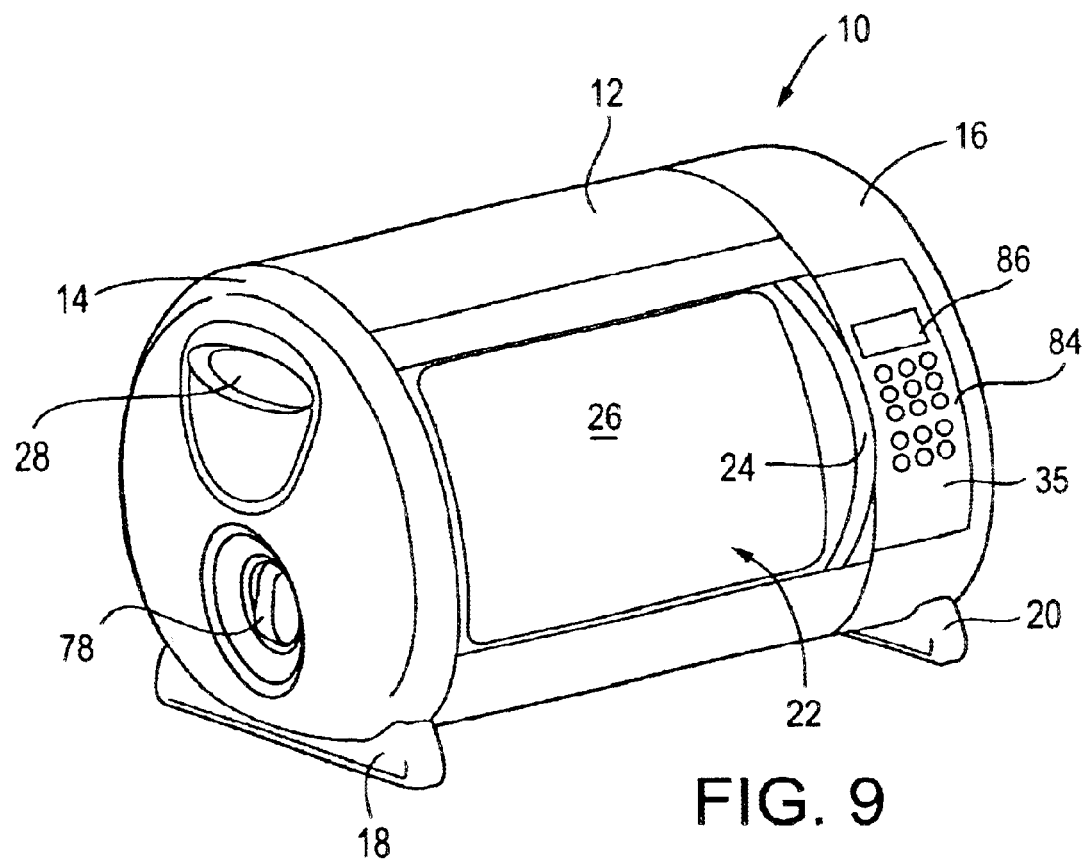
FIG. 9 shows another embodiment of a control panel for operating the oven of the invention.

Turing now to FIG. 9, and in accordance with another embodiment of the invention, a digital key pad 84 is provided on the control panel 35 for operating the oven 10. The key pad 84 is used to enter at least the the cooking temperature, the time and a start/stop signal. Data entered through the key pad 84 is process by a micro-processor or controller (not shown) provided behind the key pad 84. A display panel 86 shows the data entered through the key pad 84 and the remaining cooking time, for example.

The key pad 84 also includes a "Frozen Food" key, which when activated, automatically sets the temperature in the cooking chamber 12 to a predetermined temperature for a percentage of the set cooking time to defrost the food. The predetermined temperature is typically lower than the set cooking temperature, so that the surface of the food does not get burned. In operation, when the "Frozen Food" key is depressed, the temperature is automatically set to, for example, approximately 180° C. for 50% of the cooking time entered by the user. In this manner, the time involved in cooking frozen food is reduced, and the occurrence of food contamination during a defrost process is prevented.

Turning now to FIG. 10, and in accordance with another embodiment of the invention, the cooking chamber 12 is generally cylindrically shaped and the fan 64 for generating airflow inside the cooking chamber 12 is provided at the side wall 34 at the end housing 16. This arrangement causes the airflow to originate from the side of the cylindrical cooking chamber 12, thereby eliminating dead zones and creating a cyclonical airflow (as shown by arrows) in the cooking chamber. As a result, a more consistent temperature is generated and flows around the food, resulting in a more uniformly cooked food.

From the foregoing description, it should be understood that an improved oven has been shown and described which has many desirable attributes and advantages. The oven includes a movable heating element, and a cylindrical cooking chamber with a fan provided at the end of the chamber, which creates a cyclonical airflow for generating a uniform cooking temperature.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A combined rotisserie and convection oven comprising:
    a cooking chamber having a first end and a second end;
    a fan exposed to said cooking chamber for creating an airflow in said cooking chamber;
    a removable spit rotatably suspended between said first and second ends of said cooking chamber; and
    a heating element provided in said cooking chamber, said heating element being movable to a plurality of positions within said cooking chamber at a constant radial distance from said spit.

2. The oven as defined in claim 1 further including,
    a first and second housing separated from said cooking chamber respectively by said first and second ends;
    a first motor provided in one of said first and second housings for rotating said spit; and
    a second motor provided in one of said first and second housings for rotating said fan for creating said airflow in said cooking chamber.

3. The oven as defined in claim 2 further including a light in one of said first and second housings for illuminating said cooking chamber.

4. The oven as defined in claim 2 further including a cooling fan provided in said one of said first and second housing in which said second motor is provided, and operatively connected to said second motor for circulating air in said one of said first and second housings.

5. The oven as defined in claim 1 further including a cooking rack suspended between said first and second ends, and wherein said heating element is movable to said positions from below said cooking rack to above said cooking rack.

6. The oven as defined in claim 1 wherein said heating element is adapted to be moved generally along a circumferential direction relative to an axis of said spit.

7. The oven as defined in claim 6 wherein said heating element extends between said first and second ends.

8. The oven as defined in claim 7 wherein said heating element is ceramic coated infrared heater.

9. The oven as defined in claim 5 wherein said heating element is attached to and extend from a rotatable wheel provided proximate one of said first and second ends.

10. The oven as defined in claim 9 wherein said wheel is rotated generally along a circumferential direction relative to an axis of said spit.

11. The oven as defined in claim 9 wherein a position of said wheel is controlled by a selector switch which is electrically connected to a motor for operatively rotating said wheel.

12. The oven as defined in claim 11 wherein said selector switch is electrically connected to a motor for rotating said spit, and energizes said motor to rotate said spit when said selector switch places said heating element at a first position and deenergizes said spit rotating motor when said selector switch moves said heating element off said first position.

13. The oven as defined in claim 9 wherein said wheel is connected to a selector switch which is adapted to be rotated by a user to place said heating element at said plurality of positions.

14. The oven as defined in claim 13 wherein said selector switch is electrically connected to a motor for rotating said spit, and energizes said motor to rotate said spit when said selector switch places said heating element at a first position and deenergizes said spit rotating motor when said selector switch moves said heating element off said first position.

15. The oven as defined in claim 1 further including a control panel for setting a temperature and time for cooking food in said cooking chamber.

16. The oven as defined in claim 15 wherein said control panel includes an input for automatically changing a set cooking temperature to a predetermined temperature for a predetermined percentage of a set cooking time, and resetting said predetermined temperature to said set cooking temperature after elapse of said predetermined percentage of said set cooking time, until an end of said set cooking time.

17. A combined rotisserie and convection oven comprising:
    a substantially cylindrical cooking chamber having a first end and a second end;
    a first and second housings separated from said cooking chamber respectively by said first and second ends;
    a removable spit rotatably suspended between said first and second ends of said cooking chamber;
    a heating element provided in said cooking chamber; and
    a fan provided in one of said first and second housings and in fluid communication with said cooking chamber for generating an airflow from one of said first and second ends of said cylindrical cooking chamber to create a substantially cyclonical airflow in said cooking chamber.

18. The oven as defined in claim 17 further including,
    a first motor provided in one of said first and second housings for rotating said spit; and
    a second motor provided in said one of said first and second housings in which said fan for generating said airflow is provided, for rotating said fan.

19. The oven as defined in claim 18 further including a cooling fan provided in said one of said first and second housings in which said second motor is provided, and operatively connected to said second motor for circulating air in said one of said first and second housing.

20. A combined rotisserie and convection oven comprising:
    a cooking chamber having a first end and a second end;
    a fan exposed to said cooking chamber for creating an airflow in said cooking chamber;
    a removable a cooking rack suspended between said first and second ends; and
    a heating element provided in said cooking chamber, said heating element being movable to a plurality of positions from below said cooking rack to above said cooking rack.

21. The oven as defined in claim 20 wherein said heating element is attached to and extend from a rotatable wheel provided proximate one of said first and second ends.

22. The oven as defined in claim 21 wherein a position of said wheel is controlled by a selector switch which is electrically connected to a motor for operatively rotating said wheel.

23. The oven as defined in claim 21 wherein said wheel is connected to a selector switch which is adapted to be rotated by a user to place said heating element at said plurality of positions.

* * * * *